(12) United States Patent
Kim et al.

(10) Patent No.: US 9,147,340 B2
(45) Date of Patent: Sep. 29, 2015

(54) APPARATUS AND METHODS FOR HYBRID SERVICE DISCOVERY

(71) Applicant: Intel Corporation, Santa Clara, CA (US)

(72) Inventors: Sanghoon Kim, Ann Arbor, MI (US); Minyoung Park, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 100 days.

(21) Appl. No.: 13/713,993

(22) Filed: Dec. 13, 2012

(65) Prior Publication Data
US 2014/0115149 A1 Apr. 24, 2014

Related U.S. Application Data

(60) Provisional application No. 61/715,916, filed on Oct. 19, 2012.

(51) Int. Cl.
G08C 17/02 (2006.01)
H04W 4/08 (2009.01)
H04W 52/02 (2009.01)
H04L 29/08 (2006.01)

(52) U.S. Cl.
CPC .............. *G08C 17/02* (2013.01); *H04L 67/16* (2013.01); *H04W 4/08* (2013.01); *H04W 52/0235* (2013.01)

(58) Field of Classification Search
None
See application file for complete search history.

(56) References Cited

U.S. PATENT DOCUMENTS

| 8,311,030 | B2 | 11/2012 | Thakare |
| 2004/0103278 | A1 | 5/2004 | Abhishek et al. |
| 2005/0058151 | A1 | 3/2005 | Yeh |
| 2005/0075107 | A1* | 4/2005 | Wang et al. ................ 455/435.1 |
| 2005/0143145 | A1 | 6/2005 | Maekawa |
| 2005/0254472 | A1* | 11/2005 | Roh et al. ....................... 370/338 |
| 2008/0137682 | A1 | 6/2008 | Kish et al. |
| 2009/0059829 | A1 | 3/2009 | Bachmann et al. |
| 2009/0103501 | A1 | 4/2009 | Farrag et al. |
| 2009/0215482 | A1 | 8/2009 | Blange et al. |
| 2010/0142443 | A1 | 6/2010 | Chou et al. |
| 2010/0271947 | A1 | 10/2010 | Abdelal et al. |

(Continued)

FOREIGN PATENT DOCUMENTS

| WO | WO-2011081705 A2 | 7/2011 |
| WO | WO-2014/062249 | 4/2014 |

(Continued)

OTHER PUBLICATIONS

"International Application Serial No. PCT/US2013/048691, International Search Report mailed Oct. 24, 2013", 4 pgs.

(Continued)

*Primary Examiner* — Natisha Cox
(74) *Attorney, Agent, or Firm* — Schwegman Lundberg & Woessner, P.A.

(57) ABSTRACT

Apparatus and methods for, among other things, a hybrid service discovery protocol are discussed. In an example, a method for hybrid service discovery can include transmitting a first one or more reactive publishing beacons for a first group of stations, counting a quantity of service requests during query windows following the reactive group beacon transmissions, and publishing a first proactive publishing beacon for the first group of stations if the quantity of service requests meet or exceed a proactive service discovery threshold.

12 Claims, 3 Drawing Sheets

(56) References Cited

U.S. PATENT DOCUMENTS

| | | |
|---|---|---|
| 2010/0322213 A1 | 12/2010 | Liu et al. |
| 2011/0021223 A1 | 1/2011 | Hagerman et al. |
| 2011/0075599 A1 | 3/2011 | Liao et al. |
| 2011/0128948 A1 | 6/2011 | Jeon et al. |
| 2011/0153818 A1 | 6/2011 | Vandwalle et al. |
| 2011/0154084 A1 | 6/2011 | Vandwalle et al. |
| 2011/0199952 A1 | 8/2011 | Seok |
| 2011/0292866 A1 | 12/2011 | Zheng et al. |
| 2011/0310770 A1 | 12/2011 | Liang et al. |
| 2012/0233266 A1 | 9/2012 | Hassan et al. |
| 2013/0094536 A1* | 4/2013 | Hui et al. ............... 375/133 |
| 2013/0155925 A1* | 6/2013 | Priyantha et al. ......... 370/311 |
| 2013/0163425 A1* | 6/2013 | Hughes et al. ........... 370/235 |
| 2013/0172036 A1* | 7/2013 | Miklos et al. ............. 455/517 |
| 2013/0235773 A1 | 9/2013 | Wang et al. |
| 2013/0259018 A1 | 10/2013 | Ji et al. |
| 2013/0265906 A1* | 10/2013 | Abraham et al. ......... 370/254 |
| 2013/0268654 A1 | 10/2013 | Abraham et al. |
| 2013/0279381 A1 | 10/2013 | Sampath et al. |
| 2013/0346207 A1 | 12/2013 | Qi et al. |
| 2014/0111312 A1 | 4/2014 | Kim et al. |
| 2014/0112222 A1 | 4/2014 | Park et al. |
| 2014/0219261 A1 | 8/2014 | Johnsson |

FOREIGN PATENT DOCUMENTS

| | | |
|---|---|---|
| WO | WO-2014/062250 | 4/2014 |
| WO | WO-2014062251 A1 | 4/2014 |

OTHER PUBLICATIONS

"International Application Serial No. PCT/US2013/048691, Written Opinion mailed Oct. 24, 2013", 4 pgs.

"International Application Serial No. PCT/US2013/048701, International Search Report mailed Oct. 22, 2013", 5 pgs.

"International Application Serial No. PCT/US2013/048701, Written Opinion mailed Oct. 22, 2013", 6 pgs.

"International Application Serial No. PCT/US2013/048706, International Search Report mailed Sep. 27, 2013", 5 pgs.

"International Application Serial No. PCT/US2013/048706, Written Opinion mailed Sep. 27, 2013", 5 pgs.

Hong, Se Gi, et al., "Measurements of Multicast Service Discovery in a Campus Wireless Network", IEEE Global Telecommunications Conference, 2009. GLOBECOM 2009., (2009), 1-6.

Xu, Ziqiang, et al., "Reputation-Enhanced QoS-based Web Services Discovery", IEEE International Conference on Web Services, 2007. ICWS 2007., (2007), 249-256.

"U.S. Appl. No. 13/713,858, Non Final Office Action mailed Apr. 6, 2015", 25 pgs.

"U.S. Appl. No. 13/713,953, Non Final Office Action mailed Oct. 21, 2014", 6 pgs.

"U.S. Appl. No. 13/713,953, Response filed Mar. 23, 2015 to Non Final Office Action mailed Oct. 21, 2014", 13 pgs.

* cited by examiner

APPARATUS AND METHODS FOR HYBRID SERVICE DISCOVERY

CLAIM OF PRIORITY AND RELATED APPLICATIONS

This application claims the benefit of priority under 35 U.S.C. 119(e) to Kim et al., U.S. Provisional Patent Application Ser. No. 61/715,916, entitled, "METHOD OF COORDINATED QUERY AND RESPONSE FOR SERVICE DISCOVERY", filed Oct. 19, 2012, hereby incorporated by reference herein in its entirety.

TECHNICAL FIELD

Examples pertain service discovery protocols and, more particularly, to switching between proactive and reactive service discovery protocols or schemes.

BACKGROUND

Service discovery protocols can allow devices to find available services with or without intervention of a device user. When service discovery is combined with wireless devices, such as personal digital assistants, personal media players, cell phones, smart phones and tablets, it can provide many interesting possibilities. In some cases, wireless devices can find available services in the near area automatically. Friends in the same area can play games together with smart phones. One characteristic of this proximity based service discovery is that each device can be a service provider as well as a user. As such, it can be beneficial for a first device to inform other devices about available services on the first device at the same relative time the first device discovers service from other devices. There are some existing service discovery protocols such as Wi-Fi Direct, Universal Plug and Play (Upnp) and Bonjour. However, when the number of devices in an area increases, existing service discovery protocols can create high communication traffic volumes and can cause each station to consume a lot of energy monitoring and responding to service discovery requests.

DESCRIPTION

The inventors have recognized a hybrid service discovery scheme that can switch between a proactive service discovery protocol and a reactive service discovery protocol. In certain examples, the hybrid service discovery scheme can improve performance of service discovery by selecting an approach that can be more efficient to a given environment.

Figure 1:
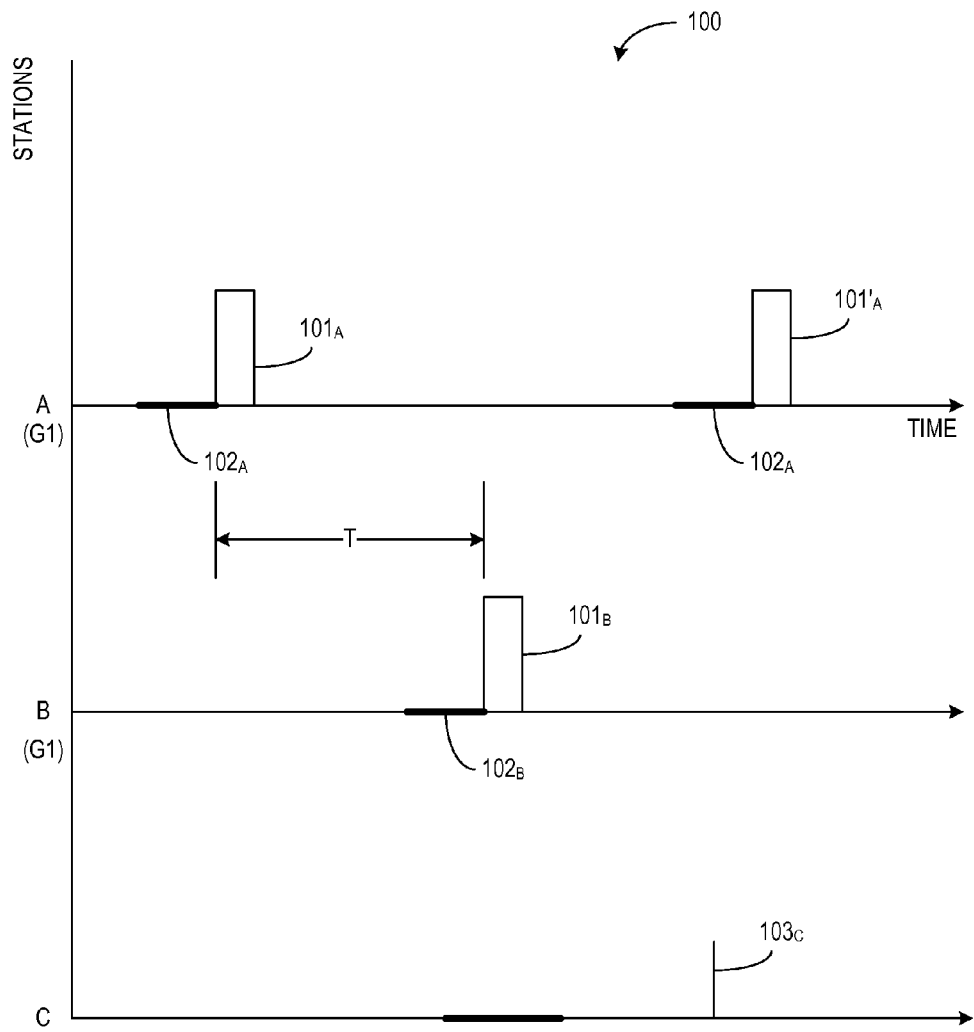
FIG. 1 illustrates generally an example of a proactive service discovery protocol.

FIG. 1 illustrates generally an example of a proactive service discovery protocol 100. A proactive service discovery protocol 100 can include broadcasting proactive publishing beacons $101_A$, $101_B$ to advertise service information or social information of one or more stations, such as stations (A, B) associated in a group (G1). In certain examples, the proactive publishing beacon 101, or group beacon, can include detailed service information about a station or a group (G1) of stations (A, B). Other stations, such as stations not belonging to the group (C), can use the detailed service information to determine whether to join the group (G1). If there are no non-member stations nearby to receive a proactive publishing beacon $101_A$, $101_B$, the energy consumed broadcasting a proactive publishing beacon $101_A$, $101_B$ can be regarded as wasted energy.

The illustrated example of FIG. 1 shows communication transmissions of a group (G1) of stations (A, B) according to a proactive service discovery protocol 100. In some examples, a group can include more or less stations than those shown in the example of FIG. 1. In certain examples, the proactive service discovery protocol 100 can expect each station or group of stations to provide a proactive publishing beacon $101_A$, $101_B$, also referred to as a proactive group beacon. In certain examples, a proactive publishing beacon $101_A$, $101_B$ can include detailed service information about the group (G1). In certain examples, the proactive service discovery protocol 100 can expect a proactive publishing beacon $101_A$, $101_B$ to be broadcast, or transmitted, at a group publishing beacon interval (T). In certain examples, the proactive service discovery protocol 100 can include a join window $102_A$, $102_B$. In some examples, the proactive publishing beacon $101_A$, $101_B$ of a group (G1) can include information about the timing of the join window $102_A$, $102_B$. During the join window $102_A$, $102_B$, one or more stations (A, B) associated the group (G1) can listen for join requests $103_C$ from stations that are not members of the group. In some examples, the join window $102_A$, $102_B$ can precede the broadcast of a proactive publishing beacon $101_A$, $101_B$. In some examples, the member station scheduled to broadcast the proactive publishing beacon $101_A$, $101_B$ can be expected to listen for join requests $103_C$ prior to broadcasting the proactive publishing beacon $101_A$, $101_B$. In certain examples, a join request $103_C$ can include service or social information about the joining station (C). In such an example, if a join request $103_C$ is received during the join window $102_A$, the next scheduled proactive publishing beacon $101'_A$ can include the service or social information associated with the joining station (C). In certain examples, inclusion of the social or service information in a group beacon can indicate acceptance of the joining station to the group. In some examples, each member of a group can be expected to accept a joining station before the station is accepted to the group. In such an example, the joining station can be expected to transmit a join request during a join window associated with each member station before being accepted as a member of the group. Examples of proactive service discovery protocols are described in Qi et al., U.S. patent application Ser. No. 13/714,056, filed Dec. 13, 2012, entitled "WIRELESS COMMUNICATION DEVICE AND METHODS FOR SYNCHED DISTRIBUTED ADVERTISEMENT FOR DEVICE-TO-DEVICE DISCOVERY", hereby incorporated by reference herein in its entirety.

Figure 2:
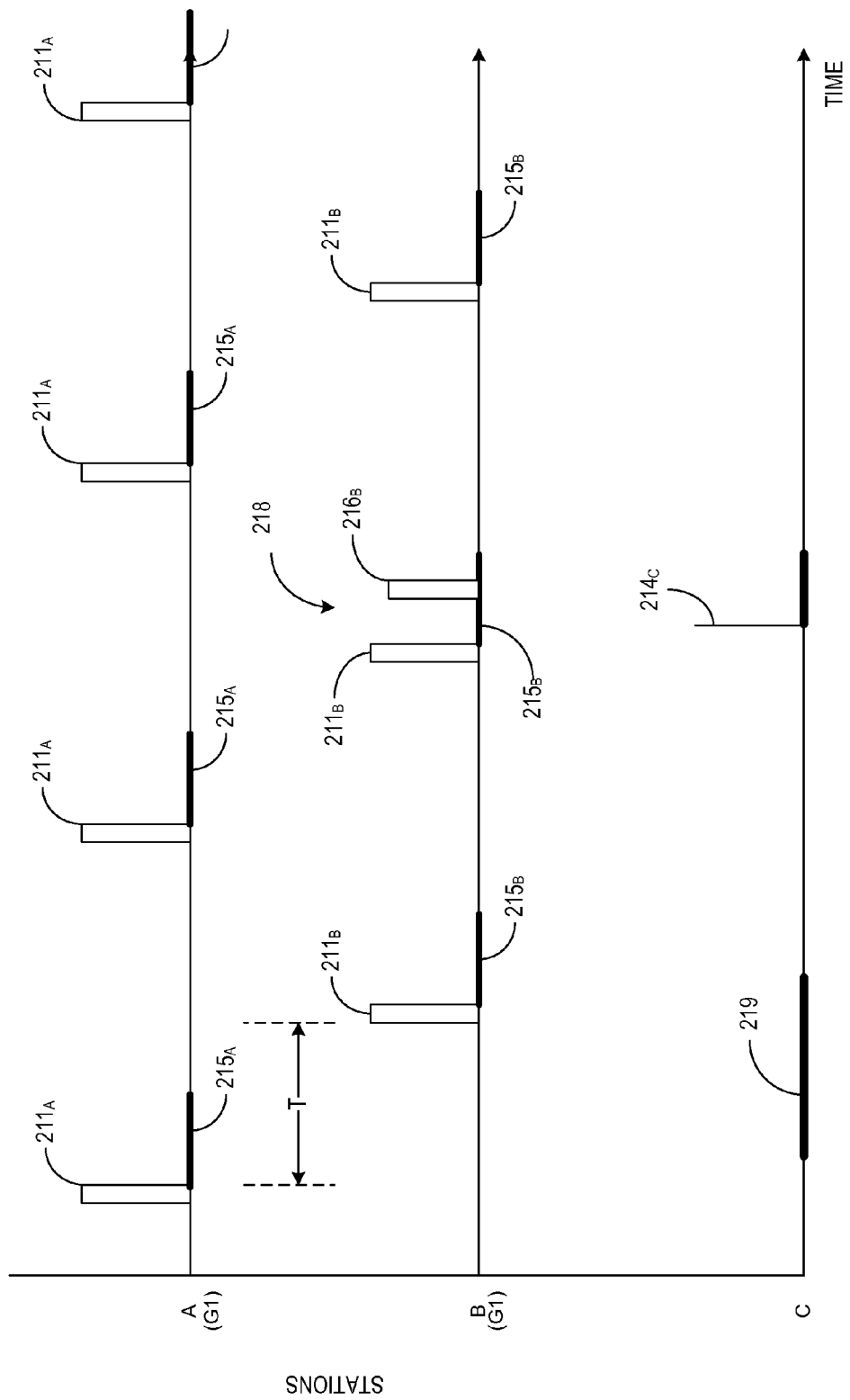
FIG. 2 illustrates generally an example of a reactive service discovery protocol.

FIG. 2 illustrates generally an example of a reactive service discovery protocol 210. In certain examples, a reactive service discovery protocol 210 can include broadcasting reactive publishing beacons $211_A$, $211_B$ to advertise service and social information of one or more stations such as stations associated in a group. In certain examples, the reactive publishing beacon, or reactive group beacon, can include minimal high-level service information about a station or a group (G1) of stations (A, B). In certain examples, other stations, such as stations (C) not belonging to the group, can use the high-level service information to determine whether a group (G1) may have a service of interest to the non-member station (C). If there is a possibility the group (G1) includes a service of interest to a non-member station (C), the non-member station (C) can engage a station (B) of the group (G1) service request/response event 218 to get more detailed information about service available from the group (G1). In certain examples, high-level service information can include general categories of services corresponding to specific services available from one or more member stations of the group. In certain examples, a reactive publishing beacon 211 can be significantly shorter than a proactive publishing beacon. As such, if there are no non-member stations nearby to receive a reactive publishing beacon, the energy consumed broadcasting the reactive publishing beacon, although wasted, can be significantly less than the energy used to broadcast a proactive publishing beacon. Conversely, in certain examples, where a significant number of stations are interested in detailed service information of a station or a group using a reactive service discovery protocol, the reactive engagement of multiple service requests and response events (e.g., 218) over a short period of time can be less efficient than proactively broadcasting detailed service information at a regular interval as is done using certain example proactive service discovery protocols.

The illustrated example of FIG. 2 shows communication transmissions and listening, or wake-up times, of a group (G1) of stations (A, B) according to a reactive service discovery protocol 210. In certain examples, each station or group of stations can be expected to provide, or broadcast, a short, energy-saving, reactive publishing beacon $211_A$, $211_B$ including service information about the group. In contrast to the proactive service discovery protocol 100, in which the publishing beacon $101_i$ can include detailed service information, the reactive service discovery protocol 210 can include a short, energy-saving, reactive publishing beacon $211_A$, $211_B$ that can include minimal, high-level service information. The minimalistic approach of the reactive service discovery protocol 210 can save battery capacity of the stations while still providing service information at a regular interval (T). In certain examples, energy loss associated with reactive publishing beacons 202 that are not received by an interested station can be much lower than energy loss associated with proactive publishing beacons of a proactive service discovery protocol 100. In addition, in certain examples, the short reactive publishing beacons 202 of a reactive service discovery protocol 210 can reduce service discovery communication traffic over a proactive service discovery protocol 100.

In certain examples, the short publishing beacon $211_A$, $211_B$ of a reactive service discovery protocol 210 may not provide detailed service information of the group (G1). However, a station (C) can initiate a service request/response event 218 of the reactive service discovery protocol 210 to receive more detailed service information of a group (G1), In certain examples, a station such as, but not limited to, a non-member station (C), can initiate a service request/response event 218 by transmitting a service request $214_C$ during a query window $215_A$, $215_B$ of the group (G1). A member station (B) station can receive the service discovery request $214_C$ during the query window $215_B$. In response to the service discovery request $214_C$, the member station (B) can provide a service response $216_B$ including detailed service information about the member station's group (G1). In certain examples, the reactive publishing beacon can include timing information for the query window. In certain examples, the reactive publishing beacon can include timing information for a join window to allow non-member stations to transmit a reactive join request to the group. In the examples of FIGS. 1 and 2, dark, thicker horizontal lines can represent intervals when a station is listening or prepared to receive transmissions such as during a query $215_i$ window or a join window $102_i$. Examples of reactive service discovery protocols are described in Park et al., U.S. patent application Ser. No. 13/713,953, filed Dec. 13, 2012, entitled "APPARATUS AND METHODS FOR GROUP-BASED REACTIVE SERVICE DISCOVERY", which is hereby incorporated by reference herein in its entirety.

In certain examples, each station of the above described protocols can be a wireless station. In some examples, each station can include a transmitter, a receiver, or a transceiver capable of communication over a Institute of Electrical and Electronic Engineers (IEEE) 802.11 compatible wireless network. In certain examples, a wireless communication module can include a transmitter, a receiver, or a transceiver capable of communication over a IEEE 802.11 compatible wireless network. In some examples, the wireless communication module can include a processor, memory and an antenna operable with a IEEE 802.11 compatible transmitter, receiver, or transceiver. In certain examples, the wireless communication module can wirelessly communicate information be stored in, or retrieved from the memory. In some examples, the transceiver, transmitter, or receiver can exchange control commands with the processor to control a mode of the wireless communication device such as switching the wireless communication device or a portion thereof into and out of a sleep mode, for example.

Figure 3:
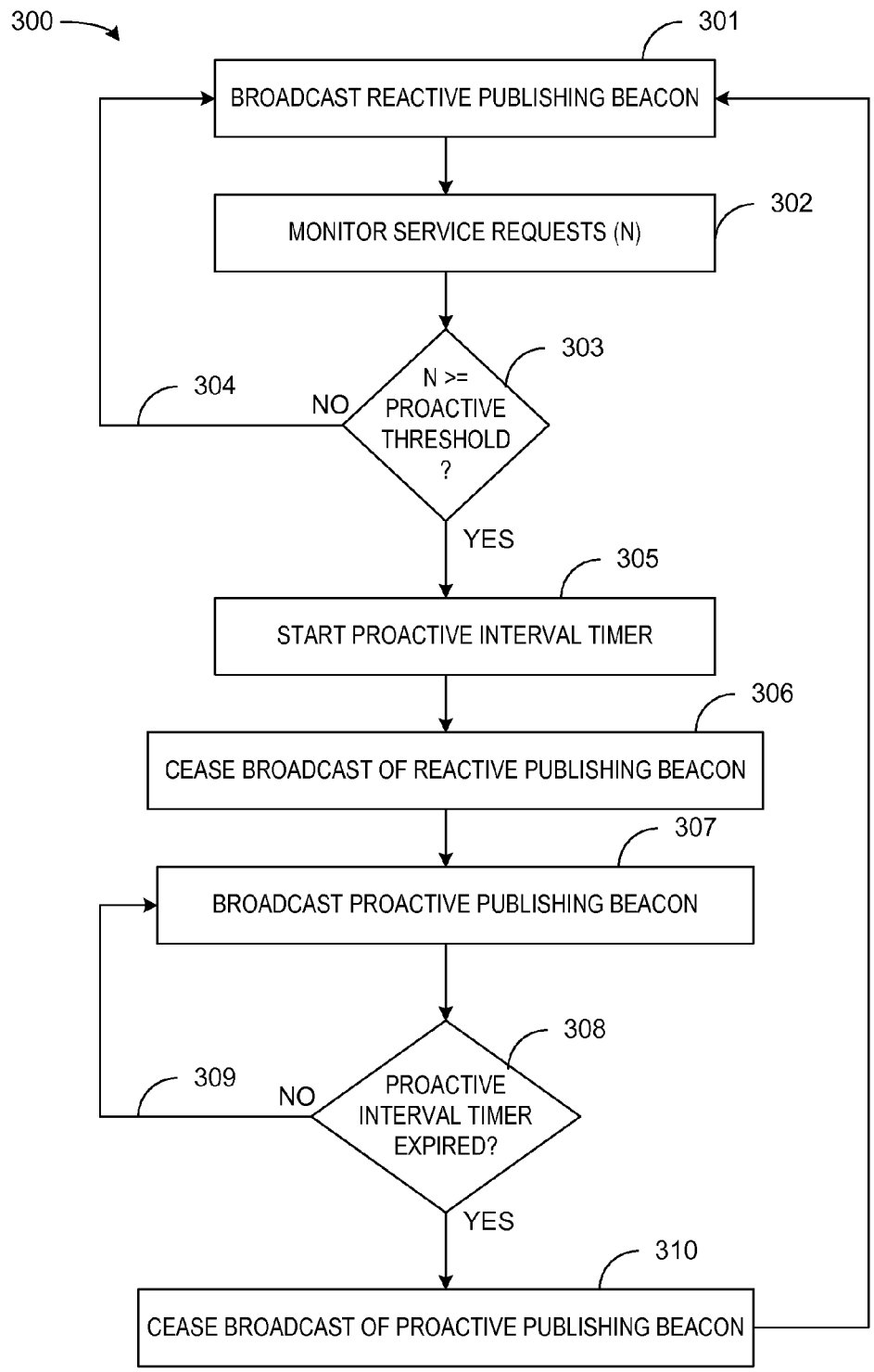
FIG. 3 illustrates generally a flowchart of an example hybrid method for switching between a proactive service discovery protocol and a reactive service discovery protocol.

FIG. 3 illustrates generally an example of a hybrid method 300 of switching between a proactive service discovery protocol and a reactive service discovery protocol. In certain examples, the method 300 can include, at 301, broadcasting one or more reactive publishing beacons. At 302, the method 300 can include monitoring the number of service requests (N) received by the stations of a group associated with the reactive publishing beacons. In certain examples, monitoring the number of service requests can include updating a count of received service requests over a given time unit. In some examples, monitoring the number of service requests received by the stations of the group can include averaging the number of service requests received by one or more stations of the group over a given unit of time. At 303, the method 300 can include comparing the monitored count of service requests to a proactive threshold and determining if, for example, the average number of service requests (N) exceeds the proactive threshold. At 304, if the average number of service requests does not exceed the proactive threshold, the method 300 can include continuing to broadcast reactive publishing beacons 301 and responding to service requests. At 305, if the average number of service requests does exceed the proactive threshold, the method 300 can initiate or commence a proactive interval timer that can expire after a proactive duration. At 306, the method 300 can include ceasing broadcast of the reactive publishing beacons ny the group and, at 307, initiating broadcasts of one or more proactive publishing beacons including detailed service information about the group. At 308, the method 300 can include determining if the proactive interval timer has expired. At 309, if the proactive interval timer has not expired, the method 300 can include continuing to broadcast proactive publishing beacons. At 310, if the proactive interval timer has expired, the method 300 can include ceasing broadcast of the proactive publishing beacons by the group and initiating the broadcast of one or more reactive publishing beacons, such as at 301.

EXAMPLES AND ADDITIONAL NOTES

In Example 1, a method for service discovery can include transmitting a first one or more reactive publishing beacons for a first group of stations, counting a quantity of service requests received during query windows following one or more of the first one or more reactive publishing beacon transmissions, and publishing a first proactive publishing beacon for the first group of stations if the quantity of service requests meets or exceeds a proactive service discovery threshold. In certain examples, at least one of the first reactive publishing beacons can include join window information and query window information In Example 2, the method of Example 1 optionally includes commencing a proactive duration interval upon the publishing of the first proactive publishing beacon.

In Example 3, the method of any one or more of Examples 1-2 optionally includes publishing additional second proactive publishing beacons during the proactive duration interval, each proactive publishing beacon of the additional proactive publishing beacons including proactive join window information.

In Example 4, the method of any one or more of Examples 1-3 optionally includes publishing a second one or more reactive publishing beacons after the expiration of the proactive duration interval.

In Example 5, the publishing the first proactive publishing beacon of any one or more of Examples 1-4 optionally includes publishing detailed service information of the first group of stations.

In Example 6, the transmitting a first one or more reactive publishing beacons for a first group of stations of any one or more of Examples 1-5 optionally includes transmitting join window information, wherein the join window information is indicative of a period of time immediately following transmission of a subsequent reactive publishing beacon.

In Example 7, the publishing the first proactive publishing beacon of any one or more of Examples 1-6 optionally includes publishing a publishing beacon interval, the publishing beacon interval indicative of an interval of time between two consecutive publishing beacons of the first group.

In Example 8, the transmitting a first one or more reactive group beacons of any one or more of Examples 1-7 optionally includes indicating within each beacon of the first one or more reactive group beacons that the reactive publishing beacon is in a reactive beacon form.

In Example 9, a wireless communication device configured for service discovery can include a transceiver configured to begin service discovery in a reactive service discovery mode, to receive and monitor a quantity of service requests, and to switch to a proactive service discovery mode if the quantity of service requests within a predetermined interval exceeds a proactive threshold. IN certain examples, the wireless communication device can include a processor to switch the transceiver between the reactive service discovery mode and the proactive service discovery mode.

In Example 10, the transceiver of any one or more of Examples 1-9 optionally is configured to transmit a reactive publishing beacon in the reactive service discovery mode, wherein the reactive publishing beacon includes join window information and query window information.

In Example 11, the join window information of any one or more of Examples 1-10 optionally is indicative of a period of time immediately following transmission of a subsequent reactive publishing beacon.

In Example 12, the reactive publishing beacon of any one or more of Examples 1-11 optionally includes general service information of a group of stations including the wireless communication device, wherein the general service information includes indications of a service category corresponding to one or more of the specific services available from the group including the wireless communication module.

In Example 13, the reactive publishing beacon of any one or more of Examples 1-12 optionally includes an indication the wireless communication device is in the reactive service discovery mode.

In Example 14, the transceiver of any one or more of Examples 1-13, in the proactive service discovery mode, optionally is configured to publish a proactive publishing beacon including detailed service information of the wireless communication device and detailed service information of other communication devices to which the wireless communication device is joined as a group.

In Example 15, the proactive publishing beacon of any one or more of Examples 1-14 optionally includes an indication the wireless communication device is in the proactive service discovery mode.

In Example 16, the transceiver of any one or more of Examples 1-15 optionally is configured to remain in the proactive service discovery mode for a programmable proactive duration before returning to the reactive service discovery mode.

In Example 17, a wireless communication device configured for service discovery can include a processor, memory coupled to the processor, and a transceiver configured to provide wireless communications of information to be store into, and retrieved from, the memory. The transceiver can be configured to begin service discovery over a IEEE 802.11 wireless network in a reactive service discovery mode, to receive and monitor a quantity of service requests, and to switch to a proactive service discovery mode if a quantity of service requests within a predetermined interval exceeds a proactive threshold.

In Example 18, the transceiver of any one or more of Examples 1-17 optionally is configured to transmit a group beacon in the reactive service discovery mode, wherein the reactive service discovery beacon includes join window information and query window information, wherein the join window information is indicative of a period of time immediately following transmission of a subsequent reactive publishing beacon, wherein the reactive publishing beacon includes general service information of a group of stations, the group of stations including the wireless communication device, wherein the general service information includes indications of a service category corresponding to one or more of the specific services available from the group of stations including the wireless communication module, and wherein the reactive publishing beacon includes an indication the wireless communication device is in the reactive service discovery mode.

In Example 19, the transceiver of any one or more of Examples 1-18, in the proactive service discovery mode, optionally is configured to publish a proactive publication beacon including detailed service information of the wireless communication device and to publish detailed service information of other communication devices to which the wireless communication device is joined as a group, and wherein the proactive publishing beacon includes an indication the wireless communication device is in the proactive service discovery mode.

In Example 20, the transceiver of any one or more of Examples 1-19 optionally is configured to remain in the proactive service discovery mode for a programmable proactive duration before returning to the reactive service discovery mode.

Example 21 can include, or can optionally be combined with any portion or combination of any portions of any one or more of Examples 1 through 20 to include, subject matter that can include means for performing any one or more of the functions of Examples 1 through 20, or a machine-readable medium including instructions that, when performed by a machine, cause the machine to perform any one or more of the functions of Examples 1 through 20.

Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. Some embodiments may include one or more processors and may be configured with instructions stored on a computer-readable storage device.

The above detailed description includes references to the accompanying drawings, which form a part of the detailed description. The drawings show, by way of illustration, specific embodiments in which the subject matters can be practiced. These embodiments are also referred to herein as "examples." All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. In other examples, the above-described examples (or one or more aspects thereof) may be used in combination with each other. Other embodiments can be used, such as by one of ordinary skill in the art upon reviewing the above description. The Abstract is provided to comply with 37 C.F.R. §1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the invention should be determined with reference to the appended claims, along with the full scope of legal equivalents to which such claims are entitled.

What is claimed is:

1. A wireless communication device configured for service discovery, the wireless communication device comprising:
   a transceiver configured to begin service discovery in a reactive service discovery mode, to receive and monitor a quantity of service requests, and to switch to a proactive service discovery mode if the quantity of service requests within a predetermined interval exceeds a proactive threshold;
   wherein the transceiver is configured to transmit a reactive publishing beacon during the reactive service discover mode, the reactive publishing beacon including general service information available from the wireless communication device and including general service information of other stations associated in a group with the wireless device;
   wherein the transceiver is configured to transmit a proactive publishing beacon during the proactive service discovery mode, the proactive publishing beacon including detailed service information available from the wireless communication device and detailed service information available from other stations associated in the group with the wireless device.

2. The wireless communication device of claim 1, wherein the reactive publishing beacon includes join window information and query window information.

3. The wireless communication device of claim 2, wherein the join window information is indicative of a period of time immediately following transmission of a subsequent reactive publishing beacon.

4. The wireless communication device of claim 2, wherein the general service information includes indications of a service category corresponding to one or more of the specific services available from the group including the wireless communication module.

5. The wireless communication device of claim 2, wherein the reactive publishing beacon includes an indication the wireless communication device is in the reactive service discovery mode.

6. The wireless communication device of claim 1, wherein the transceiver, in the proactive service discovery mode, is configured to publish a proactive publishing beacon including detailed service information of the wireless communication device and detailed service information of other communication devices to which the wireless communication device is joined as a group.

7. The wireless communication device of claim 6, wherein the proactive publishing beacon includes an indication the wireless communication device is in the proactive service discovery mode.

8. The wireless communication device of claim 1, wherein the transceiver is configured to remain in the proactive service discovery mode for a programmable proactive duration before returning to the reactive service discovery mode.

9. A wireless communication device configured for service discovery, the wireless communication device comprising:
   a processor;
   memory coupled to the processor;
   an transceiver configured to provide wireless communications of information be store into, and retrieved from, the memory; and wherein the transceiver is configured to begin service discovery over a IEEE 802.11 wireless network in a reactive service discovery mode, to receive and monitor a quantity of service requests, and to switch to a proactive service discovery mode if a quantity of service requests within a predetermined interval exceeds a proactive threshold; and wherein the transceiver is configured to transmit a reactive publishing beacon during reactive service discovery mode, the reactive publishing beacon including general service information available from the wireless communication device and including general service information of other stations associated in a group with the wireless device;

wherein the transceiver is configured to transmit a proactive publishing beacon during the proactive service discovery mode, the proactive publishing beacon including detailed service information available from the wireless communication device and detailed service information available from other stations associated in a group with the wireless device.

10. The wireless communication device of claim 9, wherein the transceiver is configured to transmit a group beacon in the reactive service discovery mode, wherein the reactive service discovery beacon includes join window information and query window information, wherein the join window information is indicative of a period of time immediately following transmission of a subsequent reactive publishing beacon, wherein the general service information includes indications of a service category corresponding to one or more of the specific services available from the group of stations including the wireless communication module, and wherein the reactive publishing beacon includes an indication the wireless communication device is in the reactive service discovery mode.

11. The wireless communication device of claim 9, wherein the proactive publishing beacon includes an indication the wireless communication device is in the proactive service discovery mode.

12. The wireless communication device of claim 9, wherein the transceiver is configured to remain in the proactive service discovery mode for a programmable proactive duration before returning to the reactive service discovery mode.

* * * * *